(12) United States Patent
Doorenspleet et al.

(10) Patent No.: US 7,517,194 B2
(45) Date of Patent: Apr. 14, 2009

(54) ROTOR BLADE FOR A WIND TURBINE

(75) Inventors: Florian Doorenspleet, Rheine (DE);
Rainer Arelt, Salzbergen (DE); Enno Eyb, Osnabrück (DE)

(73) Assignee: General Electric Company, Schenectady, NY (US)

( * ) Notice: Subject to any disclaimer, the term of this patent is extended or adjusted under 35 U.S.C. 154(b) by 384 days.

(21) Appl. No.: 11/380,938

(22) Filed: Apr. 30, 2006

(65) Prior Publication Data
US 2007/0253819 A1    Nov. 1, 2007

(51) Int. Cl.
*F03D 1/06* (2006.01)
(52) U.S. Cl. ............ 416/204 R; 416/238; 416/239
(58) Field of Classification Search ......... 416/204 R, 416/207, 209, 238, 239, 244 A, 244 R; 403/6, 403/7, 167, 8.14
See application file for complete search history.

(56) References Cited

U.S. PATENT DOCUMENTS

| | | | |
|---|---|---|---|
| 4,204,805 A | | 5/1980 | Bolie |
| 4,236,873 A | * | 12/1980 | Sherman et al. ......... 416/204 R |
| 4,412,784 A | * | 11/1983 | Wackerle et al. ............ 416/230 |
| 4,728,263 A | | 3/1988 | Basso |
| 4,915,590 A | | 4/1990 | Eckland et al. |
| 6,016,015 A | | 1/2000 | Willard, Jr. |
| 6,663,314 B2 | * | 12/2003 | Bequet ................... 403/408.1 |
| 6,910,867 B2 | | 6/2005 | Corten |
| 7,163,378 B2 | | 1/2007 | Kildegaard |
| 7,186,086 B2 | | 3/2007 | Yoshida |
| 2007/0231146 A1 | * | 10/2007 | Birkemeyer et al. .... 416/204 R |

* cited by examiner

*Primary Examiner*—Edward Look
*Assistant Examiner*—Nathaniel Wiehe
(74) *Attorney, Agent, or Firm*—Armstrong Teasdale LLP

(57) ABSTRACT

A rotor blade for a wind turbine is provided, wherein the rotor blade has radial bores in a wall of a blade root portion, the radial bores being staggered in a longitudinal direction of the rotor blade, and longitudinal bores in the wall of the blade root portion, wherein each of the longitudinal bores extends from a blade flange to a corresponding radial bore.

20 Claims, 5 Drawing Sheets

ROTOR BLADE FOR A WIND TURBINE

FIELD OF THE INVENTION

The present invention relates to a rotor blade for a wind turbine and, especially, to the configuration of the root section of such a rotor blade. Furthermore, the invention relates to a wind turbine having such a rotor blade.

BACKGROUND OF THE INVENTION

Apart from the aerodynamic design of a wind turbine rotor blade, the quality and weight of the rotor blades are essentially determined by the design of the blade connection to the rotor hub, i.e. the blade root section. What makes the design of the blade connection to the rotor hub a difficult task is the load transfer from the fiber composite structure of the rotor blade into the metal structure of the rotor hub. Such a load transfer is difficult in principle due to the substantially different properties of the materials involved. A known technique for attaching the rotor blades to the hub is to form T-bolt or cross-bolt connections between the blade root and the hub.

However, the rotor loads are concentrated at the blade root portion and the rotor hub. Furthermore, the rotor loads exhibit a highly dynamic load spectrum. Accordingly, specific design margins have to be obeyed both for the bolts and for the root laminate in the blade/hub connection. In particular, the blade bolt design margins may be exceeded so that a larger number of bolts is required for a given load spectrum. However, increasing the number of bolts reduces, in turn, the remaining amount of root laminate between adjacent T-bolt connections. As a result, the blade root connection may be insufficient to withstand extreme loads so that the blade root connection can be damaged or even break off. The above considerations are particularly critical in cases where it is planned to retrofit existing turbines with larger rotor blades.

BRIEF DESCRIPTION OF THE INVENTION

In view of the above, a rotor blade for a wind turbine is provided which includes radial bores in a wall of a blade root portion, wherein the radial bores are staggered in a longitudinal direction of the rotor blade. Furthermore, the rotor blade includes longitudinal bores in the wall of the blade root portion, wherein each of the longitudinal bores extends from a blade flange to a corresponding radial bore.

Due to the above configuration of the blade root, the radial bores are spaced from each other in a span wise direction of the rotor blade. Thus, the number of bolts for a given blade root diameter can be increased while still sufficient root laminate is provided between adjacent radial bores so that the cross-bolt connection withstands also extreme loads. Thus, the rotor loads are distributed among more bolts and sufficient root laminate margins are ensured due to the staggered layout. Especially, larger rotor blades can be installed on existing wind turbines without requiring extensive redesign of the hub, pitch bearing and blade root. Thus, the rotor diameter and wind class of an existing turbine can be improved with relatively little effort.

Further aspects, advantages and features of the present invention are apparent from the dependent claims, the description and the accompanying drawings.

According to an aspect of the invention, a wind turbine rotor blade is provided which includes, in a blade root section thereof, a plurality of radial holes and a plurality of longitudinal holes, wherein each longitudinal hole connects a hub end of the rotor blade and a radial hole, wherein the plurality of longitudinal holes comprises a first group of short holes and a second group of holes so that the radial holes associated with the first group and the radial holes associated with the second group are spaced with respect to each other in a longitudinal direction of the rotor blade.

According to an embodiment of the present invention adjacent radial bores are longitudinally spaced from each other by 0.5 to 10 times the diameter of a radial bore. Thus, the distance between neighboring radial bores is adapted to provide sufficient structural strength for bearing extreme loads.

According to a further embodiment of the present invention, the diameter of radial bores proximate the hub end of the rotor blade is smaller than the diameter of radial bores distant from the hub end of the rotor blade. Thus, the amount of root laminate between a radial bore proximate the hub end and a neighboring longitudinal bore extending to a radial bore distant from the hub end is increased compared to the case that all radial bores have the same diameter. As a result, the root/hub connection is further strengthened and can absorb higher loads.

According to another aspect of the present invention, a wind turbine having at least one rotor blade is provided. The rotor blade is attached to a hub by means of a T-bolt connection, wherein the T-bolt connection comprises fastening bolts inserted into longitudinal bolt holes provided in a blade root of the rotor blade, and cross bolts inserted into radial bolt holes provided in the blade root of the rotor blade. In this T-bolt connection, short longitudinal bolt holes and corresponding short fastening bolts and long longitudinal bolt holes and corresponding long fastening bolts are provided. Thus, a wind turbine with an improved blade/hub connection is provided. Especially, this improved connection between root and hub allows retrofitting the turbine with larger blades having the same root diameter as the smaller blades installed before.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
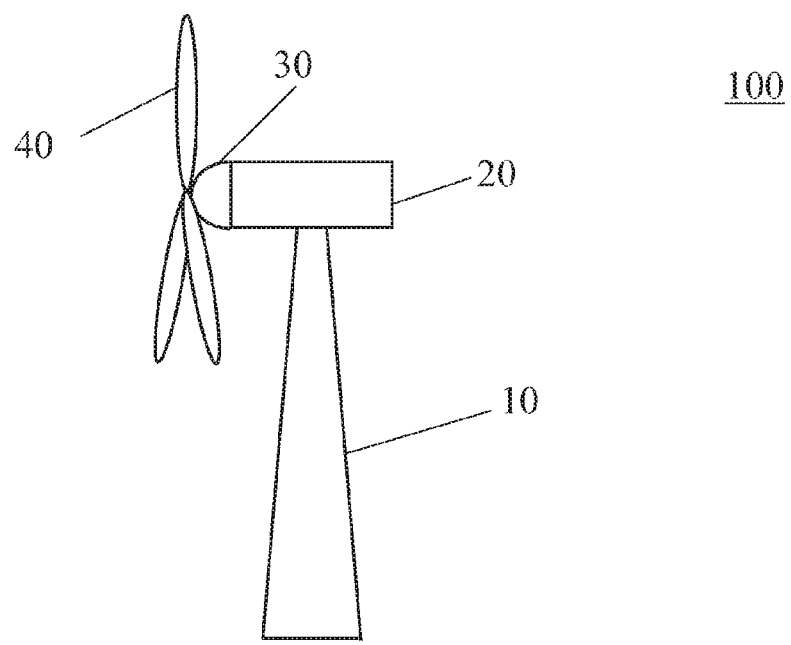
FIG. 1 is a schematic view of a wind turbine.

FIG. 1 is a schematic view of a conventional wind turbine 100. The wind turbine 100 includes a tower 10 to which a machine nacelle 20 is mounted at its top end.

A hub 30 bearing three rotor blades 40 is mounted to a lateral end of the machine nacelle 20.

Figure 2:
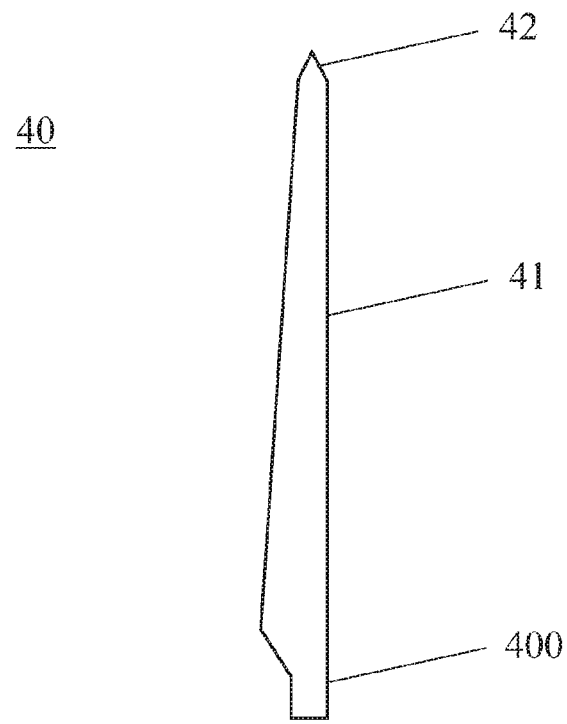
FIG. 2 is a front view of a wind turbine rotor blade.

The basic configuration of a rotor blade 40 is shown in FIG. 2. Therein, the rotor blade 40 includes a root section 400 which serves for mounting rotor blade 40 to hub 30. Opposite to root section 400, the tip end 42 of rotor blade 40 is disposed. A body section 41 of the rotor blade 40 extends between the root section 400 and the tip end 41.

Next, the design of root section 400 and, especially, a flange portion of the root section is explained with reference to FIGS. 3 to 6.

Figure 3:
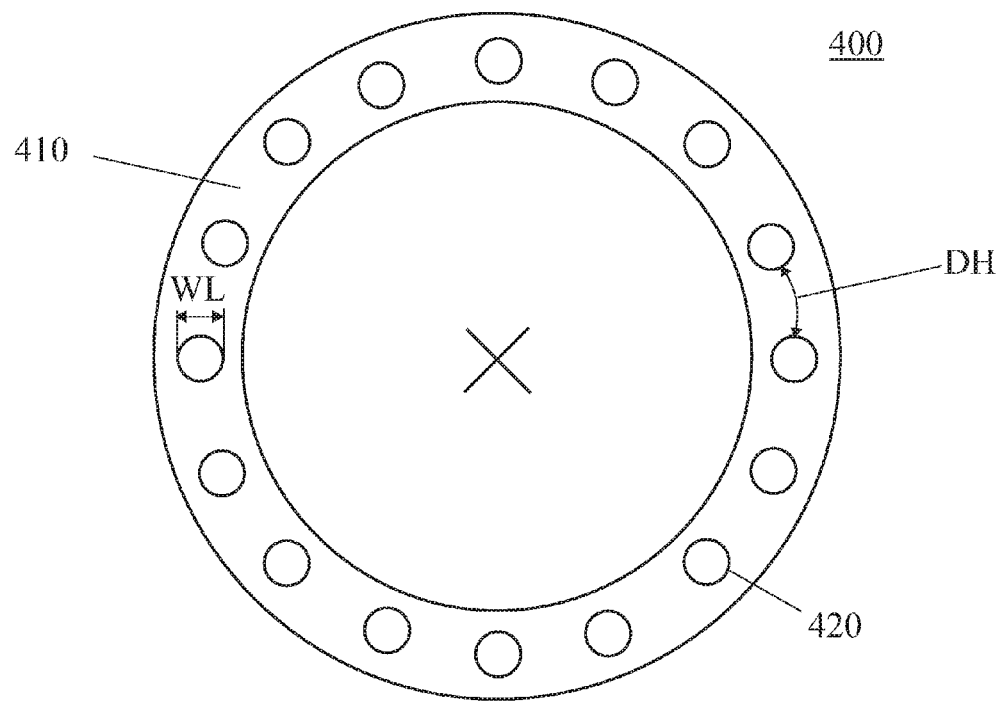
FIG. 3 is a view of a flange section of a wind turbine rotor blade.

FIG. 3 shows the blade flange 410 of a rotor blade when seen from below, i.e. from the root 400 to the tip 41 of the rotor blade. The flange section 410 has an essentially circular ring-shaped cross section. The blade flange 410 further includes a number of openings 420 corresponding to longitudinal bores (not shown in FIG. 3). The openings 420 have a width WL and are evenly spaced by a distance DH along a circumferential direction of the flange section 410. When the rotor blade 40 is mounted to a rotor hub 30, fastening bolts are inserted into the longitudinal bores to form a T-bolt connection as will be explained in more detail below.

Figure 4:
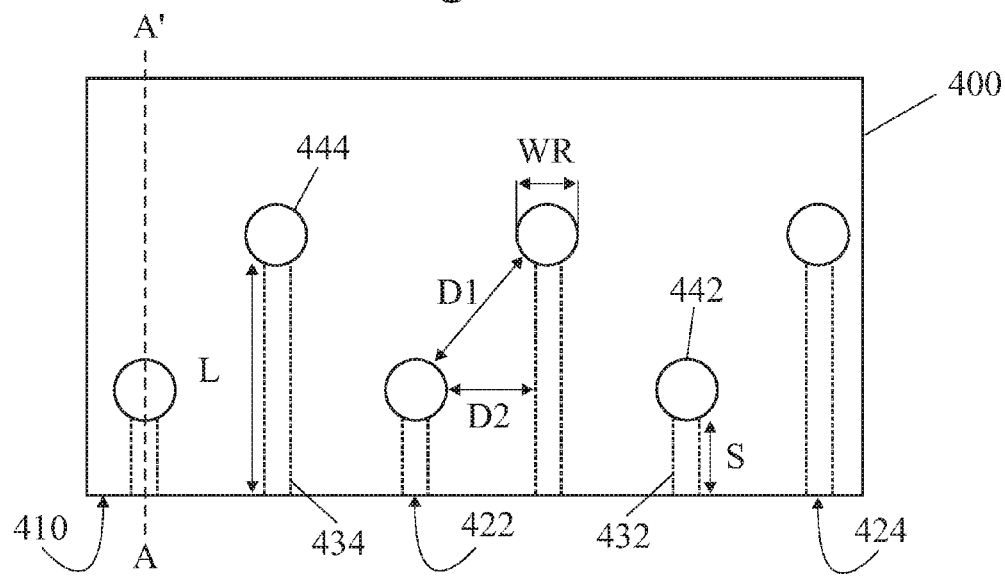
FIG. 4 is a side view of a blade root portion according to an embodiment of the present invention.

FIG. 4 shows a side view of the blade root 400. Therein, it is shown that radial bores 442, 444 are provided in the root section of the blade. These radial bores 442, 444 are configured to receive the cross-bolts of the T-bolt connection. Longitudinal bores 432, 434 (shown in broken lines) extend from the radial bores 442, 444 to the hub end 410 of the blade. At the hub end, the longitudinal bores 432, 434 provide openings 422, 424 through which fastening bolts can be inserted. As shown in FIG. 4, the radial bores are arranged along the circumference of the blade root 400. However, the radial bores are divided in a first group 442 of bores located proximate the hub end of the blade and a second group of bores 444 located distant from that end. In other words, the first group of radial bores 442 is spaced a small longitudinal distance S from the hub end 410 of the blade and the second group of radial bores 444 is spaced a long longitudinal distance L from the hub end 410. Accordingly, also the longitudinal bores are divided in a first group 432 extending only the small longitudinal distance S from the hub end 410 of the blade and a second group 434 extending the long longitudinal distance L from the hub end 410. Thus, the radial bores 442 of the first group are longitudinally spaced from the radial bores 444 of the second group by the difference L-S between the long and short longitudinal distances. Typically, this distance L-S is in the range of 0.5 to 10 times, preferably in the range of 1 to 3 times, of the diameter WR of the radial bores. Alternatively or in addition, the distance L-S may be in the range of 1 to 60%, preferably 5 to 40%, even more preferably 10 to 30%, of the long longitudinal length L. As it is shown in FIG. 4, the radial bores are alternately selected from the first group 442 and the second group 444. Thus, a distance DI with a sufficient amount of root laminate is provided between adjacent radial bores 442, 444 of the first and second groups. As a result, the circumferential spacing DH (see FIG. 3) can be reduced so that more bolt connections can be provided for a given root diameter.

In the above described embodiment, the diameters WR, WL of the radial bores 442,444 and longitudinal bores 432, 434 were selected to be identical, respectively. Also, only a single small longitudinal distance S from the hub end 410 and only a single long longitudinal distance L from the hub end 410 are provided. However, it should be understood that the present invention may be also realized with varying values of the diameters WR, WL of the radial bores 442, 444 or longitudinal bores 432, 434. Likewise, there may be several small and long longitudinal distances provided as long as it is obeyed that two neighboring radial bores are sufficiently spaced in accordance with the root laminate margins.

Figure 5:
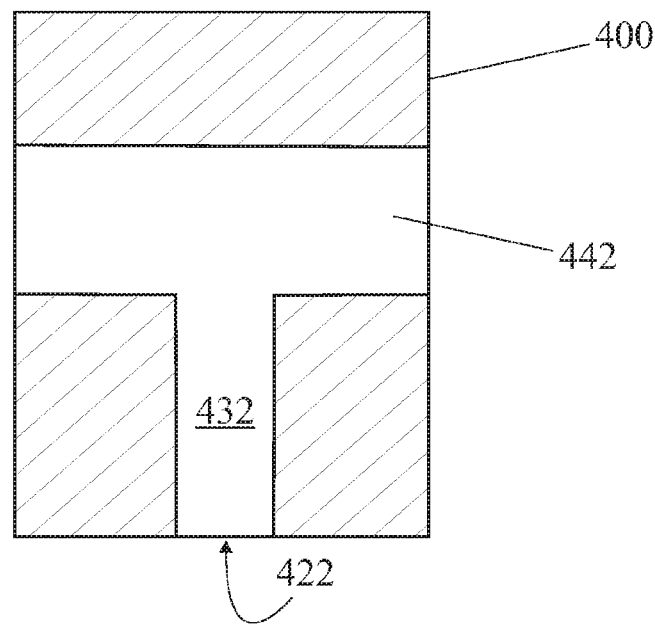
FIG. 5 is a cross-sectional view of a T-bolt connection in a flange section according to an embodiment of the present invention.

FIG. 5 is a longitudinal cross-sectional view of the flange section of blade root 400 along line A-A' in FIG. 4. The longitudinal bore 432 is located essentially in the middle between the outer sidewall surface and the inner sidewall surface of the rotor blade wall. Furthermore, a radial bore 442 is provided in the sidewall at one end of the longitudinal bore 432. At the opposite end, longitudinal bore 432 has an opening 422 in the blade flange. When the rotor blade 40 is mounted to the rotor hub 30, cross-bolts are inserted into the radial bore 442 to form a T-bolt connection with fastening bolts inserted into the longitudinal bore 432 as will be explained in more detail below with reference to FIG. 6.

Figure 6:
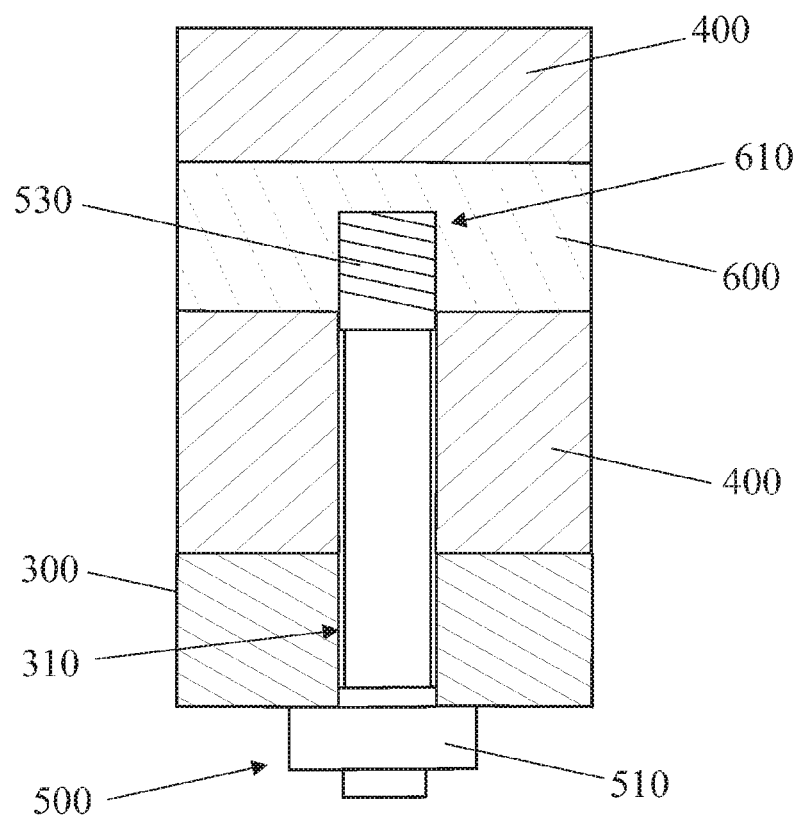
FIG. 6 is a cross-sectional view of a T-bolt connection between the blade root and a flange portion of a rotor hub according to an embodiment of the present invention.

FIG. 6 is a cross-sectional view of a cross-bolt connection formed between the root section 400 and a flange 300 of the rotor hub 30. Therein, a cross-bolt 600 is inserted into the radial bore 442. The cross-bolt 600 comprises an opening with a female thread 610. The opening 610 is aligned with the position of the longitudinal bore 432. Furthermore, the flange 300 of the rotor hub 30 abuts against the lower face of the flange section 410. The hub flange 300 has a through-hole 310 dimensioned to fit with the longitudinal bore 432 of the blade flange 400. The through-hole 310 and the longitudinal bore 432 are aligned with each other so that a fastening bolt 500 can be inserted into the through-hole 310 and the longitudinal bore 432. The fastening bolt 500 includes a male thread 530 fitting with the female thread 610 of the cross-bolt 600. Fastening bolt 500 is fixed to cross-bolt 600 via screwed fastening so that a cross-bolt connection is established. Thus, the rotor blade 40 can be fixed to the rotor hub 30.

Although the configuration of the cross-bolt connection between the rotor blade and the hub was described with reference to a short longitudinal bore 432, it should be understood that the configuration for a long longitudinal bore 434 is basically identical except for the longitudinal extension of the longitudinal bore. Especially, according to one embodiment of the present invention the configuration of the cross-bolt connection differs only in the longitudinal length of the longitudinal bores and corresponding fastening bolts for short and long bores, respectively.

In the above described bolt-connection arrangement, the flange 310 of the rotor hub, the cross-bolt 600 and the fastening bolt 500 are typically made of steel. Typically, the blade flange 400 is made of a fiber reinforced matrix. For example, the fiber reinforced matrix of the blade flange is a material including glass fibers and/or carbon fibers embedded in a matrix material. For example, the matrix material is selected from the group of an epoxy resin, an epoxy novolac, a thermosetting resin like epoxy resin, epoxy novolacs, polyesters, polyimides, both condensation and addition types, phenolic resins, and bismaleimides. Any of those resins may be selected according to the specific technical purpose the matrix material is applied to. Particularly, the resin system should be selected with respect to a particular fiber reinforcement for producing a finished hybrid fiber reinforced part with the desired mechanical and environmental properties. The resin is usually degassed under vacuum after mixing of a hardener/catalyst in the resin, to eliminate or remove all entrapped air from the liquid resin. The resin should therefore be capable of proceeding through a vacuum pressure cycle environment of heat and time without formation of gas bubbles or voids. In such a matrix material, carbon and/or glass fibers are embedded and are typically provided in the form of fiber mats. However, the fibers may also be provided in the form of a non-woven or roving fabric.

Figure 7:
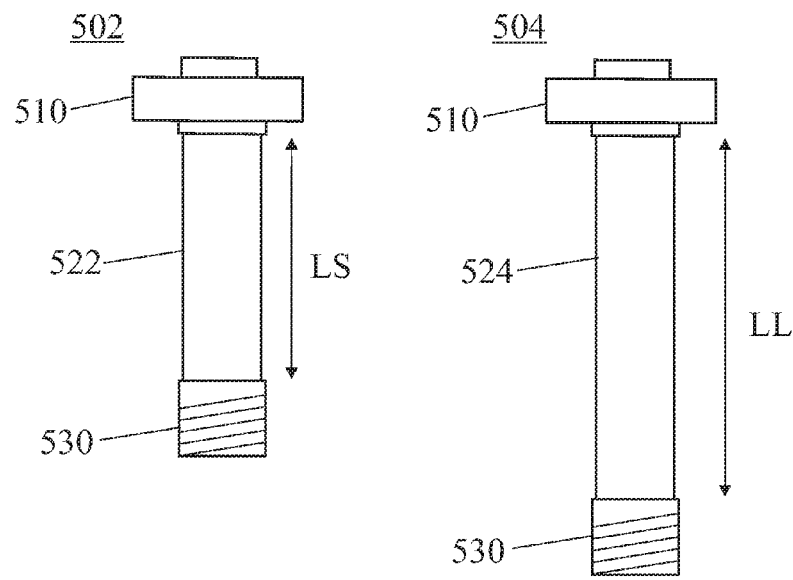
FIG. 7 shows fastening bolts according to an embodiment of the present invention.

FIG. 7 shows fastening bolts according to an embodiment of the present invention. On the left-hand side of FIG. 7, a fastening bolt 502 of a short type is shown. The short fastening bolt 502 is adapted for being inserted into a short longitudinal bore 432. The short fastening bolt 502 includes a barrel nut section 510, a short shaft 522, and a male-threaded end 530 opposite to the barrel nut section. The male-threaded end portion 530 is adapted to be screwed into a female thread 610 of a cross-bolt 600. The shaft portion 522 has a short length LS which is dimensioned to extend over the short length S of the longitudinal bore 432 and a through-hole 310 of the hub flange. Typically, barrel nut section 510 includes also a male-threaded portion (not shown) on which a barrel nut having a female thread can be fastened. Alternatively, the barrel nut section 510 may be formed integral with the shaft 522. In this case, the barrel nut section 510 may be formed as a hex nut. On the right-hand side of FIG. 7, a fastening bolt 504 of the long type is shown. Its basic configuration is the same as for the short-type bolt 502.

Figure 8:
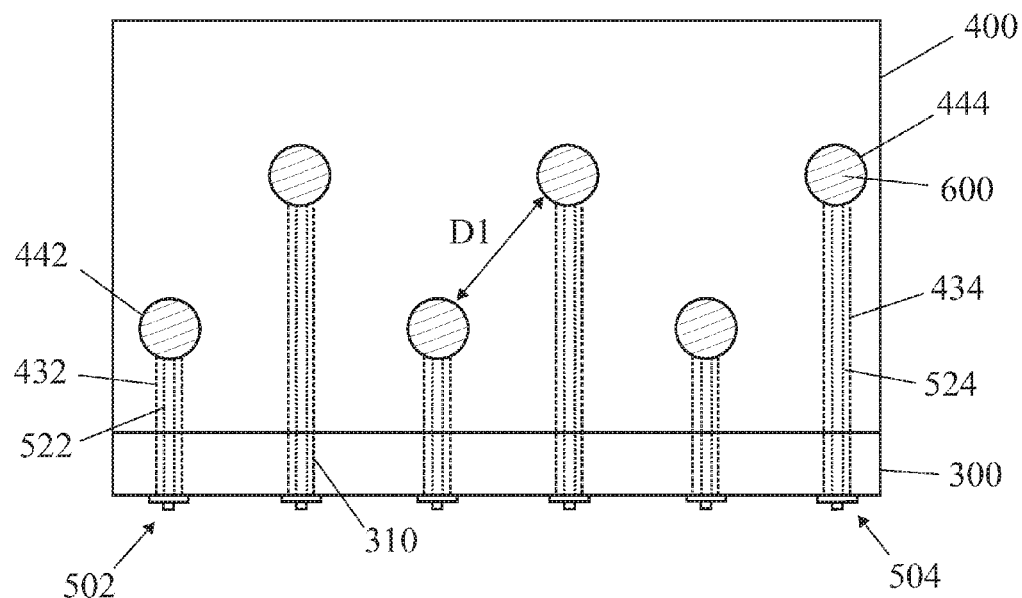
FIG. 8 is a side view of a T-bolt connection between the blade root and a flange portion of a rotor hub according to an embodiment of the present invention.

FIG. 8 is a side view of a T-bolt connection between the blade root 400 and a flange portion 300 of the rotor hub according to an embodiment of the present invention. In such a T-bolt connection, the cross-bolts 600 are inserted into the radial bores 442, 444 with their female-threaded opening 610 facing the longitudinal bores 432, 434. Short and long longitudinal fastening bolts 502, 504 are inserted into the short and long longitudinal bores 432, 434 and corresponding through-holes 310 of the hub flange 300, respectively. The fastening bolts 502, 504 are fastened by barrel nuts. Typically, the cross-bolts 600 and the fastening bolts 502, 504 are preinstalled in the rotor blade during manufacturing. In this case, the fastening bolts 502, 504 have a male-threaded portion on both end sides. Then, the rotor blade is mounted on the hub flange on the construction site, i.e. the ends of the fastening flanges 502, 504 extending from the openings 420 are inserted into the through-holes 310 of the hub flange 300. Subsequently, the T-bolt connection is finished from inside the hub by fastening barrel nuts onto the male-threaded end portions of the fastening bolts.

Figure 9:
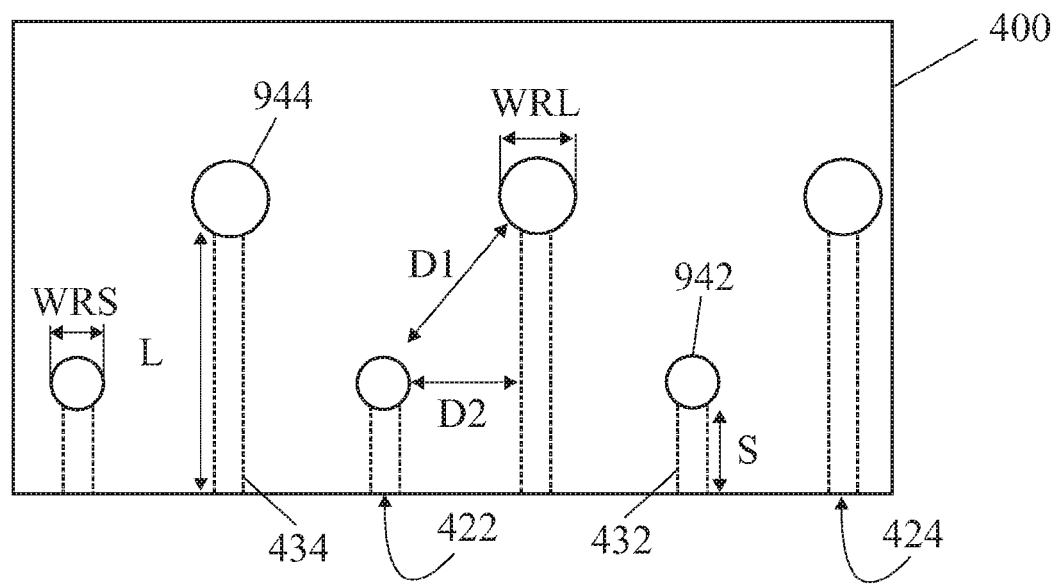
FIG. 9 is a side view of a blade root portion according to another embodiment of the present invention.

FIG. 9 is a side view of a blade root portion according to another embodiment of the present invention. The basic configuration is similar to the blade root shown in FIG. 4. However, the diameters of the radial bores vary according to the spacing of the bores from the hub end of the blade. In this particular embodiment, the diameters WRS of the radial bores 942 proximate the hub end are smaller than the diameters WRL of the radial bores 944 distant from the hub end. Therefore, not only the distance D1 between two adjacent radial bores is reduced but also the lateral spacing D2 between a radial bore 942 proximate the hub end and a vertically extending long longitudinal bore 434 next to it. Thus, the amount of root laminate between the radial bores 942 proximate the hub end and the long longitudinal bores 434 laterally passing the radial bores is increased and the root connection is further strengthened.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A rotor blade for a wind turbine, comprising
a first plurality of radial bores in a wall of a blade root portion, said first plurality of radial bores having a first diameter;
a second plurality of radial bores in the wall of the blade root portion, said second plurality of radial bores having a second diameter different from the first diameter, said first and second plurality of radial bores being staggered in a longitudinal direction of said rotor blade; and
a plurality of longitudinal bores in the wall of the blade root portion, wherein each of said plurality of longitudinal bores extends from a blade flange to a corresponding one of said first and second plurality of radial bores.

2. The rotor blade according to claim 1, wherein the longitudinal lengths of the longitudinal bores can be divided in a first group of short lengths and a second group of long lengths.

3. The rotor blade according to claim 2, wherein the longitudinal lengths of the adjacent longitudinal bores are alternately selected from the first and second group.

4. The rotor blade according to claim 1, wherein a first group of radial bores is located at a first longitudinal distance from the blade flange and a second group of radial bores is located at a second longitudinal distance from the blade flange, wherein said first distance is smaller than said second distance.

5. The rotor blade according to claim 4, wherein the radial bores are alternately selected from said first and second groups, when seen in a circumferential direction of the blade root.

6. The rotor blade according to claim 4, wherein the diameter of the radial bores in the first group is smaller than the diameter of the radial bores in the second group.

7. The rotor blade according to claim 1, wherein a first group of longitudinal bores has a first longitudinal length and a second group of longitudinal bores has a second longitudinal length, wherein said first length is smaller than said second length.

8. The rotor blade according to claim 7, wherein the longitudinal bores are alternately selected from said first and second groups, when seen in a circumferential direction of the blade root.

9. The rotor blade according to claim 1, wherein the distance between neighboring radial bores is adapted to provide sufficient structural strength for bearing extreme loads.

10. The rotor blade according to claim 1, wherein adjacent radial bores are longitudinally spaced from each other by 0.5 to 10 times the diameter of a radial bore.

11. A wind turbine rotor blade comprising, in a blade root section thereof, a first plurality of radial holes in a wall of a blade root portion, said first plurality of radial holes having a first diameter;

a second plurality of radial holes in the wall of the blade root portion, said second plurality of radial holes having a second diameter different from the first diameter, said first and second plurality of radial holes being staggered in a longitudinal direction of the rotor blade; and a plurality of longitudinal holes, each longitudinal hole connecting a hub end of said rotor blade and a radial hole, wherein said plurality of longitudinal holes comprises a first group of short holes and a second group of holes so that the radial holes associated with the first group and the radial holes associated with the second group are spaced with respect to each other in a longitudinal direction of the rotor blade.

12. The wind turbine rotor blade according to claim 11, wherein the lengths of the longitudinal holes in the first group are equal.

13. The wind turbine rotor blade according to claim 11, wherein the lengths of the longitudinal holes in the second group are equal.

14. The wind turbine rotor blade according to claim 11, wherein the difference in the longitudinal length between the first and second groups is in the range of 1% to 60% of the longitudinal length of the long holes in the second group.

15. The wind turbine rotor blade according to claim 11, wherein the longitudinal holes are alternately selected from the first and second groups, when seen in a circumferential direction of the root section.

16. A wind turbine having at least one rotor blade, said rotor blade being attached to a hub by means of a T-bolt connection, wherein the T-bolt connection comprises fastening bolts inserted into longitudinal bolt holes provided in a blade root of the rotor blade, and cross bolts inserted into a plurality of radial bolt holes provided in the blade root of the rotor blade, wherein the plurality of radial bolt holes comprises:

a first plurality of radial bores in a wall of a blade root portion, said first plurality of radial bores having a first diameter;

a second plurality of radial bores in the wall of the blade root portion, said second plurality of radial bores having a second diameter different from the first diameter, said first and second plurality of radial bores staggered in a longitudinal direction of the rotor blade; and wherein short longitudinal bolt holes and corresponding short fastening bolts and long longitudinal bolt holes and corresponding long fastening bolts are provided in said T-bolt connection.

17. The wind turbine according to claim 16, wherein the short longitudinal holes have the same length.

18. The wind turbine according to claim 16, wherein the long longitudinal holes have the same length.

19. The wind turbine according to claim 16, wherein the longitudinal length of the longitudinal bolt holes and corresponding fastening bolts alternates between long and short in a circumferential direction of the blade root.

20. The wind turbine according to claim 16, wherein adjacent radial bores are longitudinally spaced from each other by 0.5 to 10 times the diameter of a radial bore.

* * * * *